Patented Feb. 10, 1942

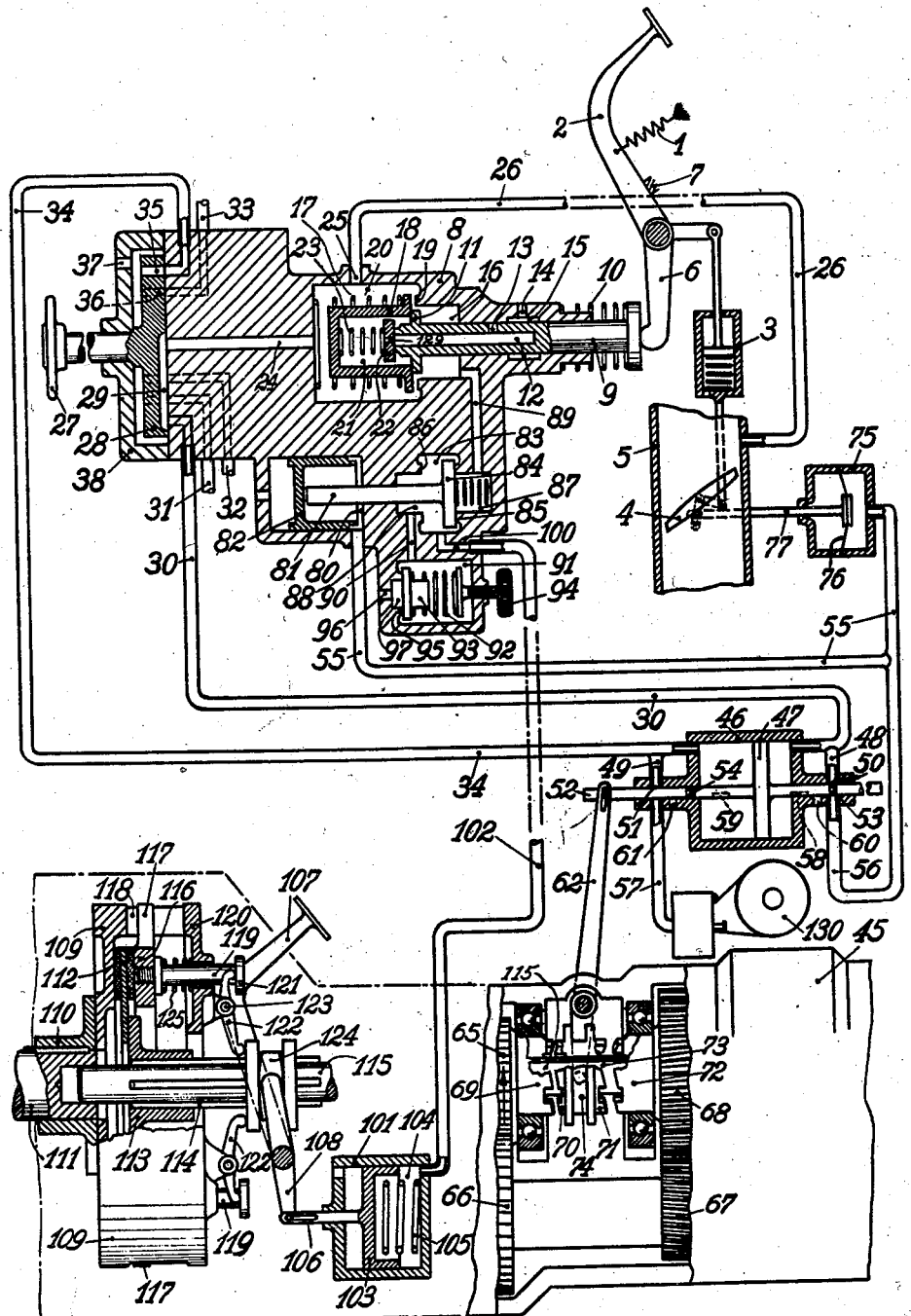

2,272,571

UNITED STATES PATENT OFFICE 2,272,571

GEAR SHIFT AND CLUTCH CONTROL APPARATUS

Karl Maybach, Friedrichshafen, Bodensee, Germany, assignor to Maybach-Motorenbau G. m. b. H., Friedrichshafen, Bodensee, Germany Application May 25, 1937, Serial No. 144,719
In Germany May 30, 1936

18 Claims. (Cl. 192—.01)

This invention relates to power operated gear shifting apparatus for motor vehicle transmissions, and has for its essential object the provision of novel mechanism auxiliary thereto by which the shifting from one gear selection to another in the transmission is accomplished with greater facility and rapidity, and without shock or strain on the parts of the transmission. In the course of shifting it is proposed to cause the parts of the transmission to be connected to produce the new gear selection and which are rotating at different relative speeds to become equalized, or more nearly so, in order that the shifting mechanism may readily effect final driving connection between the parts.

One of the main features of the invention is directed to the speeding up of a slower running part of the transmission preparatory to the bringing about its driving connection with a faster running part. This is accomplished through momentarily, at an intermediate stage of the shifting operation, engaging the main vehicle clutch and causing the vehicle motor to accelerate the slower rotating part. Automatic actuating and control mechanism operating in dependency on the gear shifting mechanism is provided for both manipulating the clutch and speeding up the motor during the change from one gear selection to another.

The clutch operating mechanism may be of the type already known, which serves to automatically disengage the clutch as soon as the motor comes to an idling speed, and which reengages the clutch as soon as the motor speed is increased by depressing the gas pedal. In utilizing such an automatic clutch mechanism in carrying out the purpose of the present invention arrangement is made to operate the same momentarily in the course of shifting gears under control of the gear shifting mechanism instead of through the gas pedal, as more fully hereafter explained.

While not limited in its application the present invention has particular utility in connection with constant meshing gear transmissions wherein clutches are employed to produce the different gear selections. The single figure of the drawing is a substantially diagrammatic view illustrating a preferred adaptation of the present invention in connection with such a transmission.

The transmission is generally designated by the numeral 45. A portion of the casing is broken away to illustrate constantly meshing gear 65, 66 and 67, 68 thereof. The portion of the transmission shown is sufficiently illustrative for purposes of the present invention, and it will be understood that the transmission may be of conventional type and constructed to produce two, three or more different speed selections. In order to alternately connect the respective gears 65 and 68 with shaft 115, driven from the motor through the clutch shortly to be described, a double claw sleeve 74 is slidably splined on the grooved part 73 of shaft 115 intermediate the two gears. Gear 65 is provided with clutch teeth 69 adapted to mesh with the opposing teeth 70 on the sleeve, and gear 68 is provided with similar teeth 72 adapted to clutch with teeth 71 of the sleeve. In the alternate left and right positions of sleeve 74, gears 65 and 66 are respectively clutched to shaft 115 to provide two different gear selections.

The crank shaft of the motor is indicated at 111, and to this is secured the fly wheel 109 through a hub 110. Clutch disc 112 is supported by a hub 113 slidably splined on keys 114 of shaft 115 leading to the transmission. Mounted slidably in fly wheel 109 to act on the clutch disc is a pressure plate 116 which is guided for axial movement through projections 117 in slots 118 of the periphery of the fly wheel. Pins 119 project rearwardly from the pressure plate through the wheel flange 120, and at the outer ends of the pins are provided heads 121 engaged by arms 122 pivotally supported at 123 on the flange 120. A sliding clutch sleeve 124 is splined to shaft 115 which on movement to the left causes arms 122 acting through pins 119 to release the pressure plate 116 against action of springs 125 and effect disengagement of the clutch. In the right hand position of sleeve 124 springs 125 cause engagement of the clutch, all as is familiar in the art. A clutch pedal 107 operating through lever 108 may be provided for manually disengaging and engaging the clutch, although automatic mechanism for this purpose is employed incident to the present invention.

The gear shifting mechanism is of the fluid pressure type utilizing servo motors which are selectively controlled through a manual selector mechanism. The system illustrated is of the vacuum type operating from the suction in the intake manifold of the engine. To accomplish the shifting operation between the respective pairs of gears 65, 66 and 67, 68 of the transmission use is made of a double acting servo motor having a cylinder 46 in which moves a piston 47 carried by piston rod 52. The latter is connected with the pivoted lever 62 and acts therethrough to cause the double claw sleeve 74 to alternately connect gears 65 and 68, through the respective clutches 69 and 72 to shaft 115.

Operating pressure for the shifting motor is supplied through the suction line 26 connecting with the intake manifold 5 of the motor which connects with port 25 and therethrough with chamber 20 of a control mechanism housing 8. From chamber 20 the operating pressure is transmitted through passage 24 to a gear selector valve 28 adjustable, for example, by means of a manually operated wheel 27. In the valve is a passage or groove 29 communicating with passage 24 and through which, in its different adjusted positions, the operating pressure is selectively transmitted through one or another of a series of supply lines connecting with the various gear shifting motors. Also located in valve 28 is a port 35 adapted to register with one or another of the shifting motor supply lines and vent the same through port 37 in the valve casing 38. In the position of the valve shown, suction is transmitted through groove 29 to line 30 connecting with the right end of cylinder 46 of the particular servomotor shown. Line 34 connecting with the left end of cylinder 46 at the same time is vented to the atmosphere through ports 35 and 37. Under such conditions atmospheric pressure prevails in the cylinder on the left side of the piston while suction is applied at the right end of the piston. The piston with its rod 52 is shown in the course of movement to the right, at which time through lever 62 the double acting clutch sleeve 74 is moving to the left. Clutch teeth 70 of the sleeve are ready to engage teeth 69 of gear 65.

By rotating valve 28 the condition in the pair of lines 30 and 34 connecting with the opposite ends of the cylinder 46 may be reversed so that suction is supplied from passage 24 through line 34, while line 30 is vented to the atmosphere. Under such conditions piston 47 would be caused to move from its right to its left position to produce clutching engagement between sleeve 74 and teeth 72 of gear 68. Thus through manipulation of valve 28 the two different gear selections may be alternately obtained through the double acting piston 47.

In addition to the pair of lines 30 and 34 additional lines 31, 32 and 33 are indicated as being controlled by valve 28. It will be understood that such lines will connect with other servomotors (not shown) which would control other clutches of the transmission 45.

In connection with the gear shifting mechanism just described it is proposed under the invention to more or less equalize the speed of the parts of the transmission in the course of the shifting operation, and to accomplish this by manipulation of the main vehicle clutch. Gas pedal 2 subject to the action of a spring 1 is connected through a spring compensating device 3 with throttle valve 4 of the carburetor of the vehicle motor, and is also connected with a second lever 6. In the retracted position of lever 2 at idling speed of the motor lever 6 is in the left end position shown limited against further movement to the left by stop 7. Lever 6 acts against the right end of a pin 9 slidable in the control mechanism housing 8, and upon depression of the gas lever pin 9 is moved to the right. On the left hand portion of pin 9 is a flange 11, and within the pin is a longitudinal bore 12 extending from its left end and communicating with a radial bore 13. When pin 9 is moved to the right under action of its spring 10 upon depressing the gas pedal bore 13 is brought in registry with annular groove 15 provided in housing 8 and connecting through port 14 with the atmosphere.

The left hand portion of pin 9 extends into chamber 16, and in its left end position with the gas pedal retracted to idling position acts through its flange 11 against the end of a valve body 18 in the suction chamber 20. As shown in the drawing flange 11 serves to raise valve body 18 from its seat 19 to provide open communication between chambers 16 and 20. Valve body 18 is acted upon by a spring 23.

Formed within valve body 18 is a chamber 21 wherein is located a valve 22 forced by the pressure of a spring 23 against the end of pin 9. If desired for purposes hereafter explained, valve 22 may be provided with a small port 129.

From chamber 16 extends a passage 89 leading into chamber 87, and thence through the adjoining chamber 83 to passage 100. The latter connects with a supply pipe 102 which leads to the chamber 104 to the right of piston 103 in the cylinder 101 of a servo motor for actuating the main vehicle clutch heretofore described. Piston 103 is acted upon by spring 105, and is provided with a piston rod 106 connecting with the clutch actuating lever 108 which serves to move the clutch sleeve 124. When piston 103 is held by spring 105 in its left end position the clutch is engaged, and when suction is applied through line 102 to move piston 103 to its right end position the clutch is disengaged.

The clutch operating mechanism, to the extent so far described, will function in dependency on the gas pedal 2. When the pedal is in retracted position as shown in the drawing pin 9 is in its left hand position under the action of spring 1 operating through lever 6. Flange 11 on pin 9 holds valve body 18 off its seat 19 allowing suction from pipe 26 to pass from chamber 20 through chamber 16, through passage 89, and eventually through line 102 to move piston 103 of the clutch servomotor to the right and cause the clutch to release. On the other hand, when the gas pedal 2 is depressed pin 9 under action of its spring 10 moves to the right, allowing valve body 18 to engage its seat 19 and thus cutting off communication between the suction in chamber 20 and chamber 16. Pin 9 continues to move to the right, releasing flange 11 from engagement with valve body 18 and establishing communication between chamber 16 and chamber 21. The radial port 13 in pin 9 is brought into registry with groove 15 to establish communication through port 14 between bore 12 of the pin and the outer air. During movement of pin 9 to the right as flange 11 moves through chamber 16 the compression on spring 23 in chamber 21 becomes less so as to allow valve 22 to unseat. Atmospheric pressure from the outside thence passes through bore 12, chamber 21, chamber 16, passage 89, and eventually through line 102 to vent chamber 104 of the clutch servomotor. Piston 103 is then caused to move to its left end position under action of its spring 105 to effect engagement of the clutch.

Arrangement is made in connection with the clutch operating mechanism to cause the clutch to be partially engaged during operation of the gear shifting mechanism in dependency on the latter without operation of the gas pedal 2, and further arrangement is made so that at the same time the vehicle motor may be speeded up, also independently of the gas pedal, so that the slower running part of the gear transmission may be accelerated to facilitate its engagement with the part with which it is to be connected in producing a new gear selection under operation of the gear shifting motor, all as now to be described.

A cylinder 75 having therein a piston or a diaphragm 76 operates through a rod system 77 to open throttle valve 4 of the carburetor. When member 76 moves to the right the throttle valve is opened and through the provision of the compensating device 3 this is accomplished without disturbing the released position of gas pedal 2 or causing any movement of pin 9, and the other parts of the clutch system. An operating suction is transmitted to cylinder 75 to produce this action from supply line 30 communicating with the right end of the gear shifting motor cylinder 46. Branching off from line 30 is a line 48 connecting with port 50 in the right hand guide portion of cylinder 46, and a corresponding line 56 transmits the suction therefrom to line 55. Located in the piston rod 52 is an annular groove 53 which in the position shown establishes communication between lines 48 and 56. In such position, as previously explained, suction is being applied through line 30 to the right hand end of cylinder 46, and piston 47 has moved sufficiently to the right to bring teeth 70 of the double clutch sleeve 74, into preliminary engagement with the teeth of gear 65 which is rotating at a faster speed. As the teeth are finally engaged piston 47 will move further to the right to bring groove 58 of piston rod 52 opposite line 56 and cause the latter line and cylinder 75 to be vented to the atmosphere through port 60.

In order to enable the increased speed of the vehicle motor to be transmitted through shaft 115 to effect the speeding up of the clutch sleeve 74 preparatory to final engagement thereof with the teeth of gear 65, special mechanism is provided in the control housing 8 responsive to operation of the gear shifting motor to quickly partially engage the main vehicle clutch, and then to immediately release the same after the gear shifting motor has brought the gear clutch parts in the transmission into final engagement.

Located in chamber 83 in housing 8 is a double acting valve 84 which in its right end position engages a seat 85 to cut off communication between chamber 83 and chamber 87. When valve 84 is moved to such position suction transmitted through chambers 20 and 16, passage 89, and chamber 87 is cut off from the supply line 102 of the main clutch servomotor. Except during operation of the gear shifting motor 46 valve 84 is urged through a spring at its right end against its left hand valve seat 86, and under such conditions communication is maintained between suction line 89 and clutch motor supply line 102 through chambers 87 and 83. Valve 84 is provided with a pin 81 extending through a bore into chamber 80 of the housing 8 in which is located a piston 82. Connecting with chamber 80 is a second branch of suction line 55, the first branch of which communicates with cylinder 75. With the position of piston 47 and rod 52 of the gear shifting motor shown in the drawing suction from line 30 will be supplied through the intermediate lines 48 and 56, and the respective branches of line 55 simultaneously to cylinder 75 which serves to speed up the vehicle motor and to chamber 80 whose piston 82 acts upon pin 81 to shift valve 84 against its right end seat 85.

The movement of valve 84 from its left seat 86 to its right seat 85 establishes communication between chamber 83 and chamber 88 to the left thereof. From chamber 88 extends a passage 90 opening into a further chamber 91. In chamber 91 is located a valve 93 engageable with a seat 95. A small chamber 97 behind the valve has a port 96 opening to the atmosphere. Valve 93 is held in engagement with its seat by a spring 92 adjustable through a screw tensioning member 94. By reason of the partial vacuum created in chamber 91 when the same is put into communication with chamber 83 and the clutch motor supply line 102, difference in pressure exists on the two sides of valve 93 in the chambers 91 and 97 and the valve is caused to open against the tension of its spring allowing chamber 104 of the clutch motor to be vented by reason of the communication then existing between line 102, chamber 83, chamber 88, passage 90, chamber 91, chamber 97, and port 96. When the pressures on the opposite sides of valve 93 have been partially equalized to an extent dependent upon the tensioning adjustment of spring 92 the valve is caused to close. By adjustment of member 94 it is possible to regulate the extent to which the vacuum condition is reduced in chamber 104 of the clutch motor. In carrying out the purposes of the invention the adjustment will be such that the suction in the clutch motor chamber is only partially vented. Piston 103 will move to the left only sufficiently to produce a light engagement between the parts of the main clutch. As soon as the clutch has been so engaged shaft 115 will be driven by shaft 111, and since the vehicle motor has been speeded up clutch sleeve 74 on shaft 115 will be accelerated until its speed is sufficient to enable the teeth 70 to be brought into final engagement with teeth 69 of the originally faster moving transmission gear 65. As soon as complete engagement has been brought about piston 47 of the gear shifting motor will move to its final right end position under the suction existing in line 30. The corresponding movement of piston rod 52 will move groove 58 therein into registry with line 56 and vent 60. The two branches of line 55 connecting with line 56 will thereupon be immediately vented through port 60. Member 76 in cylinder 75 will thereupon move to the left to release throttle valve 4, and cause the vehicle motor to slow down, and at the same time the venting of chamber 80 through the second branch in line 55 will enable the spring to the right of the valve 84 to cause the valve, its pin 81 and piston 82 to be moved to their left end position. As soon as valve 84 is moved into engagement with its left seat 86, chamber 88, passage 90 and the venting valve 93 will be cut off from communication with chamber 83. Suction will then again be transmitted to chamber 83 through passage 89 and chamber 87 and be applied to the clutch motor through line 102 so as to cause the clutch to again release.

It will be understood that during operation of valve 93 the vehicle clutch parts are engaged only sufficiently to speed up the clutch sleeve 74 in the transmission and that as soon as the clutch sleeve has been moved into final engagement with the corresponding clutch half of the gear 65 the vehicle clutch parts will slip relative to each other. If the main clutch were completely engaged when the gear shifting had been completed motor shaft 111 would continue to drive shaft 115, and cause a shock on the operating parts and jerking of the vehicle since a complete drive would exist between the motor and the vehicle wheels. As previously indicated the extent to which the clutch parts are caused to engage and still provide the desired slipping action under these conditions will be determined by adjustment of spring 92 of valve 93.

When utilizing the spring tension valve 93 to effect partial venting of the clutch motor and the corresponding partial engagement of the vehicle clutch, chamber 91 which houses valve 93 can be made relatively small. The employment of valve 93 to control port 96 is not entirely necessary.

In addition to the mechanism for speeding up a slower running part of the transmission, I have also indicated diagrammatically a brake apparatus 130 for slowing down a faster moving transmission part preparatory to connecting the same to a slower moving part. Such braking apparatus will likewise be controlled by the gear shifting motor so as to operate at an intermediate stage of the movement of the gear shifting motor piston 47 when suction is supplied on the left side thereof through line 34. Line 49 branches off line 34 and connects with a port 51 in the left end portion of cylinder 46. Groove 54 in piston rod 52 is brought opposite line 49 and suction is thereby established in line 57 to cause the latter to exercise a braking action on the faster moving transmission part. After the transmission parts have been brought into final engagement through movement of piston 47 into its left end position groove 59 in piston rod 52 vents line 57 through port 61 to release the braking apparatus 130.

The operation of the embodiment of the invention above described in detail will now be summarized.

During travel of the vehicle the main clutch will be engaged and some gear selection of the transmission will be connected therein. The accelerator pedal will be in some depressed position. The gas pedal may be raised or lowered to vary the vehicle speed without moving pin 9 since lever 6 connecting with the gas pedal engages pin 9 only when the gas pedal is in the last stage of movement to its idling position.

As the pedal is released pin 9 is moved to the left raising valve 18 from its seat 19 and allowing operating pressure, that is suction, from line 26 and chamber 20 to be supplied through chamber 16, line 89 and chamber 87.

At this time valve 84 is held in its left position against seat 86 by its spring. The suction accordingly passes on through chamber 83 through line 102 to chamber 104, causing the clutch motor piston 103 to move to the right and fully release the main clutch.

If no gear selection is set through adjustment of gear selection valve 28, valve 84 remains in its left position, and the vehicle clutch is held released, in freewheeling, until the gas pedal is again depressed to speed up the motor. When the latter is done pin 9 moves to the right under action of its spring 10, venting bore 12 through port 13, groove 15 and port 14. During movement of pin 9 to the right valve 18 is brought into engagement with its seat 19, thereby cutting off suction in the chamber 20 from chamber 16. When valve 18 has reached its seat 19, but before pin 9 has reached its right end position a pressure differential exists on opposite sides of valve 22 since bore 12 is now vented to the atmosphere, but suction still exists in chamber 21 and in the other parts of the system. Valve 22 is therefore moved to the left against action of its spring 23, allowing the suction prevailing in chamber 16, line 89 and the other communicating parts to be partially reduced until the pressure acting on the opposite sides of the valve 22 are balanced by the force of spring 23. At that time valve 22 again closes under the action of its spring. As a result of the partial venting clutch motor piston 103 is moved part way to the left under action of its spring 105, and the clutch begins to engage. Even without any further venting through valve 22 piston 103 will continue to move gradually to the left through ordinary leakage around such piston and the clutch will gradually be brought into fully engaged position. By reason of such gradual connection of the clutch driving engagement between the motor and the vehicle wheels is brought about without shock. In this connection it is furthermore pointed out that during the final movement of pin 9 towards its right end position the tension on spring 23 acting on valve 22 is gradually decreased as the gas pedal is depressed from its idling position. Hence, by suitable manipulation of the gas pedal and corresponding variation in the tension of spring 23 the operation of valve 22 can be somewhat controlled so that the flow of air past valve 22 can be made faster or slower, and accordingly venting of the main clutch motor and reengagement of the clutch will occur more or less slowly. If it is found that the clutch operates too slowly a small throttle bore 129, heretofore referred to, may be provided in valve 22 to accelerate the clutch action.

It has so far been assumed that the gas pedal has been returned to idling position to release the clutch and then subsequently again depressed without any gear shifting operation. If, however, the gear selecting valve 28 has been adjusted the new gear selection will be set before the gas pedal is again depressed. Assuming that suction exists in the clutch motor so that the latter is fully released, the setting of the gear selection causes suction from chamber 20 to be transmitted through bore 24 and groove 29 to a gear shifting motor, which will be assumed to be the one, 46, here illustrated. Further assuming that clutch sleeve 74 through its teeth 71 has been in driving engagement through teeth 72 with gear 73, the application of suction through line 30 will cause piston 47 to move part way to the right at which time the opposite teeth 70 make preliminary engagement with teeth 69 of gear 65. At this stage groove 53 in piston rod 52 is in the position shown in the drawing and suction from line 30 is transmitted to the two branches of line 55. The vehicle motor is speeded up through partial opening of throttle valve 4 under action of member 76 in cylinder 75. At the same time suction causes piston 82 in chamber 80 to move to the right, whereby through pin 81 valve 84 is moved against its right seat 85 to cut off the supply of suction to the main clutch motor. The clutch motor is then partially vented through port 96 and the action of the valve 93 to momentarily bring the main clutch into light engagement. Shaft 115 is accordingly caused to rotate at a higher speed, and its sleeve 74 is accelerated until the teeth 70 and 69 are in condition to be brought into final complete engagement. Piston 47 of the gear shifting motor moves to its right end to bring about such final engagement. Through the corresponding final movement of piston rod 52 to the right suction is cut off from cylinder 75 and chamber 80, and these are immediately vented through lines 55 and 56, groove 58 and port 60. The carburetor throttle valve 4 is moved to slow down the motor, and valve 84 is moved to its left end position by its spring. Suction is reestablished through chambers 87 and 83 to line 102, and piston 103 of the clutch motor moves to its right end position to fully release the main clutch. When after the gear shifting operation has been effected in the manner just described the gas pedal is depressed, pin 9 will assume its right end position and the main clutch will be engaged by venting of the clutch motor through ports 13 and 14 in the manner heretofore described.

From the description here given it will be understood that the essential function of valve 84 is to render inoperative the normal control mechanism of the main clutch motor, and to provide for the control thereof by the gear shifting mechanism momentarily during shifting from one gear selection to another. Valve 93 functions to regulate the degree of engagement of the clutch at such time. Valves 18 and 22 operate alternately under control of the gas pedal to effect disengagement and engagement of the vehicle clutch, and such parts are positioned so as to be rendered inoperative under control of valve 84.

The invention is not to be taken as limited to the particular fluid pressure system and detailed arrangement of operating parts shown, but is to be measured by the scope of the appended claims.

I claim:

1. In a motor driven vehicle having a clutch and a variable speed gear transmission, fluid pressure operated gear shift means for the transmission, fluid pressure operated means for actuating the vehicle clutch, and control means for the clutch actuating means responsive to the gear shifting means to effect actuation of the clutch during shifting action of the gear shift means.

2. In a motor driven vehicle having a clutch and a variable speed gear transmission, a motor for shifting the transmission gears to different speed selections, a motor for actuating the vehicle clutch, and control means for the clutch motor operating in dependency on the gear shift motor to cause the clutch motor to briefly engage and then disengage the vehicle clutch intermediate the shifting by the shifting motor of the transmission gears from one gear selection to another.

3. In a motor driven vehicle having a clutch and a variable speed gear transmission, power operated gear shift means for shifting the transmission parts to different gear selections, and mechanism operative to accelerate a slower running transmission part during operation of the shift means to bring about engagement of said slower running part with a faster moving transmission part, said mechanism including means for momentarily engaging and then disengaging the vehicle clutch and means for speeding up the vehicle motor.

4. In a motor driven vehicle having a clutch and a variable speed gear transmission, power operated gear shift means for shifting the transmission parts to different gear selections, and mechanism controlled by the gear shift means operative to accelerate a slower running transmission part during operation of the shift means to bring about engagement of said slower running part with a faster moving transmission part, said mechanism including means for momentarily engaging and then disengaging the vehicle clutch, and means for speeding up the vehicle motor during said momentary engagement of the clutch.

5. In a motor driven vehicle having a clutch and a variable speed gear transmission, power operated gear shift means for the transmission, actuating means operative to engage and then disengage the vehicle clutch during the period of shifting from one gear selection to another, means for changing the speed of the vehicle motor, and control means for both said clutch actuating means and said motor speed increasing means operating in dependency on said gear shift means.

6. In a motor driven vehicle having a clutch and a variable speed gear transmission, a servo motor gear shift for the transmission, a servo motor operator for the vehicle clutch, control means for the vehicle clutch motor working in dependency on the gear shift motor, said control means being operative during shifting of a slower running part and a faster running part of the transmission into driving connection to cause the vehicle clutch motor momentarily to engage, and also being operative when said transmission parts have been connected to cause the vehicle clutch to disengage, and means operative during said shifting operation to cause the vehicle motor to speed up while the clutch is momentarily engaged so as to accelerate the slower running transmission part preparatory to its connection with the originally faster running transmission part.

7. In a motor driven vehicle, a clutch, a variable speed gear transmission, a servo motor gear shift for the transmission, a gas control for the vehicle motor, a motor for the vehicle clutch normally controlled by the gas control, and means operating independently of the gas control for causing the clutch motor to operate in dependency on the gear shift motor during the course of the shifting action thereof to bring about driving connection between a slower running part and a faster running part of the transmission.

8. In a motor driven vehicle, a clutch, a variable speed gear transmission, a servo motor gear shift for the transmission, a servo motor clutch operator, control means for the clutch motor, and further control means for the clutch motor independent of said first control means and being responsive to the gear shift motor during shifting action thereof to bring about driving connection between a slower running part and a faster running part of the transmission.

9. In a motor driven vehicle having a clutch, a fluid pressure clutch actuating motor, a variable speed gear transmission and a power operated gear shift motor for the transmission, means controlled by the gear shift motor during shifting movement thereof for adjusting the operating pressure of the clutch motor to effect partial but incomplete engagement of the clutch.

10. In a motor driven vehicle having a clutch, a fluid pressure clutch actuating motor, a variable speed gear transmission and a power operated gear shift motor for the transmission, means for causing the vehicle motor to accelerate a slower running transmission part during shifting action of the gear shift motor to bring about driving connection between said slower running part and a faster running transmission part, means responsive to the gear shift motor controlling the operating pressure of the clutch motor during said shifting operation, and a second control means operating independently of the gear shift motor controlling operation of the clutch motor at times other than during shifting action of the gear shift motor.

11. In a motor driven vehicle, a variable speed gear transmission, a power operated gear shift motor for the transmission, a clutch, a fluid pressure clutch operating motor, a fluid pressure supply system for the clutch motor, means for causing the vehicle motor to speed up during shifting into connection of a slower running part and a faster running part of the transmission, and a control member in the clutch motor supply system operating in dependency on the gear shift motor to control the supply of operating pressure to the clutch motor and effect momentary engagement of the clutch during shifting of the slower running and faster running transmission parts into connection.

12. In a motor driven vehicle, a variable speed gear transmission, a power operated gear shift motor for the transmission, a clutch, a fluid pressure clutch operating motor, a fluid pressure supply system for the clutch motor, means for causing the vehicle motor to speed up during shifting into connection of a slower running part and a faster running part of the transmission, and a control member in the clutch motor supply system operating in dependency on the gear shift motor to control the supply of operating pressure to the clutch motor and effect momentary engagement of the clutch during shifting of the slower running and faster running transmission parts into connection, said control member operating upon completion of the connection between said transmission parts to restore the supply of operating pressure to the clutch motor and causing the clutch to be disengaged.

13. In a motor driven vehicle, a variable speed gear transmission, a power operated gear shift motor for the transmission, a clutch, a fluid pressure clutch operating motor, a fluid pressure supply system for the clutch motor, means for causing the vehicle motor to speed up during shifting into connection of a slower running part and a faster running part of the transmission, a control member in the clutch motor supply system operating in dependency on the gear shift motor to control the supply of operating pressure to the clutch motor during shifting of a slower running transmission part into connection with a faster running transmission part, and means coactive with said control member to reduce the operating pressure previously acting on the clutch motor so that said motor operates to effect engagement of the clutch during said shifting operation.

14. In a motor driven vehicle, a variable speed gear transmission, a power operated gear shift motor for the transmission, a clutch, a fluid pressure clutch operating motor, a fluid pressure supply system for the clutch motor, means for causing the vehicle motor to speed up during shifting into connection of a slower running part and a faster running part of the transmission, control valve means in the clutch motor supply system operating in dependency on a lever controlling the vehicle, said means controlling the admission of operating pressure to the clutch motor and the release of operating pressure from said motor, and a control member in the supply system beyond said control valve means operating in dependency on the gear shift motor to control the supply of operating pressure to the clutch motor and effect momentary engagement of the clutch during shifting of the slower running and faster running transmission parts into connection.

15. In a motor driven vehicle, a variable speed gear transmission, a power operated gear shift motor for the transmission, a clutch, a fluid pressure clutch operating motor, a fluid pressure supply system for the clutch motor, means for causing the vehicle motor to speed up during shifting into connection of a slower running part and a faster running part of the transmission, control valve means in the clutch motor supply system operating in dependency on a control lever of the vehicle, said means controlling the admission of operating pressure to the clutch and the release of operating pressure from said motor, a control member in the clutch supply system beyond said control valve means operating in dependency on the gear shift motor to control the supply of operating pressure from the clutch motor during shifting of a slower running transmission part into connection with a faster running transmission part, and means coactive with said control member to reduce the operating pressure previously acting on the clutch motor so that said motor operates to effect engagement of the clutch during said shifting operation.

16. In a motor driven vehicle, a clutch, a motor for engaging and disengaging the clutch, a variable speed gear transmission driven by the vehicle motor through said clutch, clutch means in said transmission for engaging and disengaging different gear selections, shift means for said transmission clutches, and control means for the vehicle clutch motor operating in dependency on the shift means, said control means being operated by the shift means after the latter has disengaged one transmission clutch to release a previous gear selection to actuate the vehicle clutch motor to effect engagement of the vehicle clutch and drive the transmission by the vehicle motor, and said control means being again operated by the shift means before final engagement of another transmission clutch to produce the next gear selection to cause the vehicle clutch motor to disengage the vehicle clutch.

17. In a motor driven vehicle having a clutch and a variable speed gear transmission, a gas lever controlling the vehicle motor speed, a fluid pressure motor for operating the clutch, a control valve operated by the gas lever controlling the supply of operating pressure to the clutch motor, means for shifting the transmission gears to different speed selections, and a second pressure control valve also controlling the supply of operating pressure to the clutch motor, and actuating means for closing and opening the second pressure control valve controlled by the operation of the gear shift means.

18. In a motor driven vehicle having a clutch and a variable speed transmission, a source of fluid pressure, a fluid pressure motor for operating the clutch, conduit means connecting said source to said motor, first pressure control valve means in said conduit means operative to control the supply of pressure to the clutch motor, means for shifting the transmission gears to different speed selections, second control valve means in said conduit means operative to cut off the supply of pressure through the conduit means from said source to said motor, and actuating means for operating said second valve means controlled by operation of the gear shifting means.

KARL MAYBACH.